United States Patent [19]
Li et al.

[11] Patent Number: 5,426,944
[45] Date of Patent: Jun. 27, 1995

[54] CHEMICAL PURIFICATION FOR SEMICONDUCTOR PROCESSING BY PARTIAL CONDENSATION

[75] Inventors: Yao-En Li, Buffalo Grove; John Rizos, Frankfort, both of Ill.

[73] Assignee: American Air Liquide, Inc., Walnut Creek, Calif.

[21] Appl. No.: 114,584

[22] Filed: Aug. 31, 1993

[51] Int. Cl.$^6$ ............................ F25J 3/00; C01B 7/07
[52] U.S. Cl. .......................................... 62/11; 62/16; 62/17; 423/240 R; 423/488
[58] Field of Search ................................ 62/11, 16, 17; 423/240 R, 488

[56] References Cited

U.S. PATENT DOCUMENTS

| | | | |
|---|---|---|---|
| 862,906 | 6/1908 | Hasenbach | 423/240 R X |
| 2,389,457 | 11/1945 | Pines et al. | 423/488 |
| 2,426,914 | 9/1947 | Allen | 423/488 |
| 2,463,188 | 3/1949 | Latehum, Jr. | 423/488 |
| 2,695,875 | 11/1954 | McGarvey | 423/488 X |
| 3,260,059 | 7/1966 | Rosenberg et al. | 423/488 X |
| 3,707,066 | 12/1972 | Carne et al. | 62/11 X |
| 4,623,369 | 11/1986 | Yamazaki | 62/11 |
| 4,892,625 | 1/1990 | Shimizu et al. | 423/488 X |
| 4,964,278 | 10/1990 | Wen et al. | 62/55.5 |
| 4,975,259 | 12/1990 | Hyakutake et al. | 62/11 X |
| 4,980,144 | 12/1990 | Koto et al. | 423/240 R X |
| 5,027,642 | 7/1991 | Wen et al. | 73/23.2 |

FOREIGN PATENT DOCUMENTS

| | | |
|---|---|---|
| 86105258.7 | 4/1986 | European Pat. Off. . |
| 90400595.6 | 3/1990 | European Pat. Off. . |
| 0443698 | 8/1991 | European Pat. Off. . |
| 0290588 | 6/1991 | Germany . |
| 2-233503 | 9/1990 | Japan . |
| 1664378 | 7/1991 | U.S.S.R. . |

OTHER PUBLICATIONS

Control of Cold Trap—by Monitoring Pressure discharging Non-Condensable Gases and Maintaining Pressure at Set Value, (Abstract No. J49117365, WPI/Derwent).
LN$_2$ Piping Systems and Semiconductor Quality and Yield (400 Solid-State Technology, vol. 25 91982) Jul., No. 7, Port Washington, N.Y.).

*Primary Examiner*—Christopher B. Kilner
*Attorney, Agent, or Firm*—Townsend and Townsend Khourie and Crew

[57] ABSTRACT

A purification method and apparatus for creating ultra-purity chemicals for semiconductor processing. The purification method includes a step of expanding an ESG chemical through an orifice (17) inside a condenser (21) to a partial condensed state for removing impurities from ESG chemical. During the expansion step, the higher boiling point impurities remain in the liquid phase and the impurities in the vapor phase are removed at least in part by a scavenging technique. After purification, the ultra-purified gas is transferred to a semiconductor manufacturing operation (24). The manufacturing operation includes both dry and wet processes. The method may also be integrated into a large volume on-site purification system (30), on-line point of use purifier (50), or small volume trans-filling purification system (70).

35 Claims, 5 Drawing Sheets

CHEMICAL PURIFICATION FOR SEMICONDUCTOR PROCESSING BY PARTIAL CONDENSATION

BACKGROUND OF THE INVENTION

The present invention relates to a method and apparatus for the ultra-purification of chemicals for semiconductor processing. In particular, the present invention provides a purification process where a compressed fluid is partially condensed by expanding the fluid through an orifice or any other expansion means such as a capillary or the like.

In the manufacture of semiconductor devices, the industry requires high purity chemicals to avoid the introduction of defects into the device during various processing steps. Such processing steps include, among others, plasma etching, wet etching, and the like. The presence of impurities in the processing chemicals used in these processes often cause defects. In processing chemicals such as hydrochloric acid (HCl), chlorine gas ($Cl_2$), nitrogen trifluoride ($NF_3$), or the like, the impurities include metal contaminants (eg., Fe, Ni, Cr, Cu, Al, Mn, Zn, etc.), moisture (eg., $H_2O$), carbon dioxide (eg. $CO_2$), and the like.

In ESG HCl, the predominant impurities are typically iron and moisture. When geometrically large enough, the impurities can, for example, short-out adjacent active structures within a device, and thus cause lower wafer yields (or die per wafer). Such impurities are known in the art as "particles." In addition, if the impurities are charged, the charged impurities are generally detrimental to the electrical characteristics of the device. Moreover, the impurities can also be corrosive to the device structure. As line widths for the state-of-art device become smaller (typically sub-micron), the industry demands high purity chemicals having lower impurity levels. In addition to the manufacture of semiconductors, the optical, aerospace, pharmaceutical industries, and the like also require high purity chemicals.

In the past, the semiconductor industry often used electronic semiconductor grade chemicals supplied in bottles. The bottles contain high purity chemicals also called electronic semiconductor grade (ESG) chemicals having purity levels of about 99.99% by weight or "four nine" purity. The bottles are also typically about 20 liters or less in size. However, the electronics industry is currently switching to chemicals in bulk on-site supplies. The use of ESG chemicals in bulk provides the manufacturer with lower chemical costs because bulk chemicals require less handling and have a lower cost per unit than bottled chemicals.

However, the change to bulk on-site supplies within the industry is not free from problems. For example, electronic semiconductor grade chemicals such as ESG HCl inherently possess moisture. The moisture causes severe corrosion in parts such as transport lines, bulk storage tanks, valves, pressure regulation devices, and pumps. Such parts are typically required for providing the chemicals in bulk on-site supplies. As the ESG HCl breaks down the parts, additional impurities are released into the chemical stream. Therefore, a typical maintenance program requires the periodic replacement of the parts to reduce the amount of impurities originating therefrom. The maintenance program also replaces the parts to lessen their failure rate. Since the parts often carry highly corrosive chemicals, the parts demand proper maintenance to prevent chronic failure, and thus reduce serious safety and/or environmental problems.

The semiconductor industry needs ultra-purified chemicals having low levels of impurities. To purify the chemicals, impurities are partially removed using a metal filter process. The metal filter process employs a filter having a certain amount of iron therein. The metal filter partially purifies HCl by filtering out a portion of the impurities on the small pores of the filter. However, because of iron in the filter material itself, the metal filter introduces increased levels of iron into the HCl. The increased level of iron in the HCl is detrimental to the manufacture of the semiconductor device. In addition, the corrosive nature of the HCl which attacks the filter material itself decreases filter efficiency and life. Decrease in filter life often leads to increased filter maintenance and thus higher costs in operating the metal filter process. Thus, the metal filter process fails to provide the ultra-purified HCl required for manufacturing the state-of-art device.

From the above, it is seen that an improved technique for generating high purity chemicals for the electronics industry is needed.

SUMMARY OF THE INVENTION

The present invention provides a method and apparatus for creating ultra-purified chemicals for semiconductor processing by expanding a compressed fluid to a partially condensed state. In particular, the present method expands an ESG chemical comprising impurities through an orifice or any other expansion means such as a capillary or the like to a partially condensed state. The ultra-purified gas phase resulting from the partial condensation is then transferred to semiconductor processing equipment for use.

In one embodiment, the invention provides a method for purifying a fluid for semiconductor processing to an ultra-purified state wherein a compressed fluid comprising impurities is expanded to a partially condensed state. The compressed fluid includes at least either a compressed gas, a compressed liquid, or a combination of compressed gas and compressed liquid. The partially condensed state includes at least a vapor phase and a liquid phase. The expanding step removes impurities from the vapor phase and preferentially includes them in the liquid phase. The expanded gas is withdrawn or partially withdrawn and then transferred to a semiconductor manufacturing operation. The compressed fluid is purified since the impurities having a higher boiling point than the fluid preferentially fall out into the liquid state during the expanding step. The impurities in the vapor state are removed at least in part to the liquid state by a scavenging technique. These techniques for removing impurities from the fluid are discussed in detail below.

The present invention also provides an apparatus for purifying a fluid to an ultra-purified state for semiconductor processing. The apparatus includes a condenser for partially condensing a compressed fluid comprising impurities. An inlet coupled to the condenser transports the compressed fluid into condenser. An orifice or any other expansion means in the condenser means expands the compressed fluid. The expanded fluid has at least a vapor phase and a liquid phase wherein the vapor phase has a lower concentration of impurities than the compressed fluid. A withdrawal means draws out the vapor phase. The apparatus further includes a means for distributing the ultra-purified vapor to semiconductor processing equipment.

Preferably, the purification apparatus also eliminates the need for a down stream pressure reduction valve by reducing the pressure of the compressed fluid. The elimination of the down stream pressure reduction valve prevents impurities from entering the purified gas stream from a decaying down stream pressure reduction valve, and eliminates the need for routine maintenance performed on such valves. By eliminating the pressure reduction valve, the purification apparatus provides ultra-purified chemicals at a desired pressure.

The semiconductor processing equipment may include dry processing equipment such as, for example, plasma etchers, reactive ion etchers, and the like as well as wet processing equipment such as, for example, wet etchers, acid dipping tanks, plating tanks, and the like. Since the chemical is being purified immediately before use, impurities entering the chemical stream from aging cylinders and/or bottles are eliminated.

A further understanding of the nature and advantages of the present invention may be realized by reference to the latter portions of this specification and attached drawings.

DESCRIPTION OF THE SPECIFIC EMBODIMENT

Figure 1:
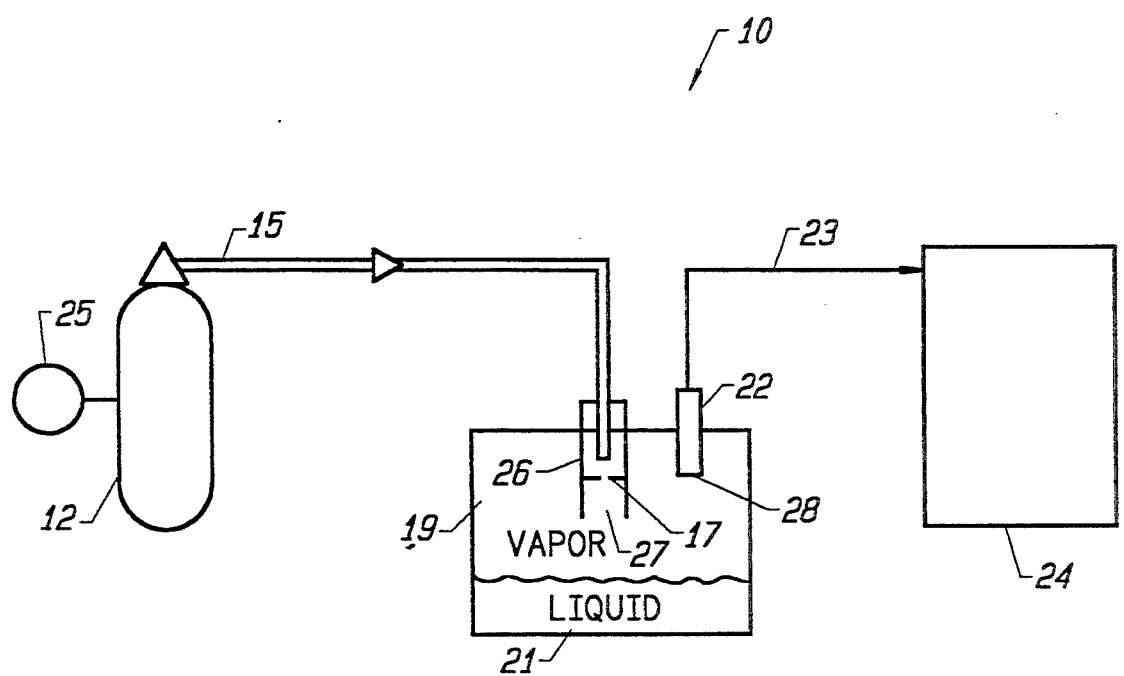
FIG. 1 is a diagram for the HCl purification process integrated into a semiconductor manufacturing operation.

FIG. 1 is a schematic diagram for the purification process integrated into a semiconductor manufacturing operation 10. This diagram shows, for example, the purification of compressed HCl in combination with a generic semiconductor manufacturing operation. The HCl may be a compressed gas, a compressed liquid, or a combination of compressed gas and compressed liquid. This manufacturing operation may be, for example, a dry chemical process such as plasma etching, reactive ion etching, or the like, or a wet chemical process such as wet etching, acid dipping, plating, and the like. The ESG HCl comprising impurities originates from cylinder 12 and flows through transportation line 15 to an orifice (or expansion means) 17 within the condenser 19. The liquified gas drops to the bottom 21 of the condenser and the purified HCl vapor with a lower concentration of impurities is drawn from the gas phase through a collector 22. The purified HCl flows through the down stream line 23 to the semiconductor operation 24 for use. In the HCl system, the HCl is purified predominately by expanding the fluid at a partially condensed state within the condenser.

The purification process occurs by controlling variables affecting the thermodynamics of the system. In the purification process of FIG. 1, for example, the thermodynamics are consummated by the compressed HCl expanding through the orifice located in the condenser. The expansion process is a function of extrinsic variables such as pressure, temperature, orifice diameter, condenser design, and the like, as well as intrinsic fluid characteristics.

The required pressure and temperature for the compressed HCl originates from, for example, the compressed HCl contained in the cylinder or the like. To create the required pressure and temperature, an auxiliary pressure enhancing device 25 such as a pump, compressor, or the like may be attached into the system. For the HCl system, the pressure ranges between about 100 bar and about 10 bar. The pressure has a corresponding temperature between about 500K and about 200K. Preferably, compressed HCl has a pressure of about 47 bar and a temperature of about 300K.

The resulting flow rate and down stream temperature for the withdrawn gas are predominantly dependent upon the intrinsic characteristics of the fluid and orifice diameter. For the HCl purification process, for example, the down stream line temperature of the withdrawn vapor is inversely proportional to the size of the orifice diameter. A larger diameter produces a lower down stream temperature typically more rapidly. However, the flow rate is a proportional to the orifice diameter. A larger orifice produces a higher flow rate. At steady state operation, the orifice diameter controls the resulting flow rate and down stream temperature of the ultra-purified gas.

To produce the desired down stream flow rate during purification, the size of the orifice diameter is adjusted. For the HCl process, a typical semiconductor manufacturing operation employs an orifice diameter between about 10 $\mu$m and 100 $\mu$m. These orifice diameter sizes produce a corresponding liquid flow rate between about 0.1 liters/min. and about 5.0 liters/min, respectively. Preferably, the HCl process uses an orifice diameter between about 20 $\mu$m and about 90 $\mu$m with a corresponding liquid flow rate between about 0.2 liters/min. and about 3.0 liters/min, respectively. The orifice is coupled to the transportation line having a diameter between about 4.0 cm. and about 0.1 cm. Preferably, the HCl system uses a transportation line having diameter of about 0.6 cm. Depending upon the nature of the fluid purified, the size of the orifice diameter and transportation line are adjusted to produce the desired flow rate and down stream temperature for purification.

The orifice is preferably covered by a sleeve 26 to prevent the condensing liquid from moving directly from the inlet to the collector. The free end 27 of the orifice/sleeve is directed downwards at the liquid phase although the same result may be achieved by locating the orifice/sleeve a sufficient distance from the collector. For the HCl system, the free end of the orifice/sleeve protrudes down towards the liquid where the free end of the orifice/sleeve is horizontally between about 1 cm. and about 6 cm., and vertically between about 2 cm. and about 8 cm. from the free end 28 of the collector. Preferably, the free end of the orifice/sleeve is horizontally about 2.5 cm. and vertically about 5.0 cm. from the free end of the collector.

The purification process includes the collector within the condenser to withdraw the ultra-purified chemical. The collector is made from materials such as, for example, the product sold under the trademark TEFLON ™ or KALREZ ™ and the like. The collector has a length between about 1.0 cm. and about 7.0 cm. and a width between about 0.5 cm. and about 4.0 cm. Geometrically, the collector is shaped either as a cylinder, sphere, cube, rectangular box or the like where the free end is directed toward the liquid phase. The down stream line having a diameter between about 0.2 cm. and about 3.0 cm is attached to the collector. Preferably, for the HCl system, the collector is geometric shaped as, for example, a cylinder. The cylinder includes a length of about 4.0 cm., a width or diameter of about 0.6 cm. The collector is located at least about 1.0 cm. from the orifice and away from the sidewall of the condenser.

As for the condenser, the purification process includes a cylindrically shaped condenser. The condenser has a diameter ranging between about 3.0 cm. and about 30.0 cm., and a depth between about 4.0 cm. and about 50.0 cm. Preferably, for the HCl process, the condenser has a diameter of about 6.0 cm. and depth of about 10.0 cm. The free ends of the orifice/sleeve and collector protrude towards the liquid phase from the top of the condenser.

To reduce chemical attack on the condenser material, the condenser is fabricated from a chemical resistant material. Such chemical resistant material may be, for example, a fluorocarbon based plastic including the product sold under the trademark TEFLON TM or KALREZ TM, quartz, glass, or the like.

As shown, HCl flows from the cylinder, through the transport line to the orifice located in the condenser. At the orifice, the HCl expands at a temperature between about 218K to about 188K, depending upon the thermodynamic expansion path, for purification. After the expansion step creating the partially condensed fluid, the collector withdraws the purified HCl vapor at a pressure of about 1 bar while the liquified gas falls out from the gas phase to the bottom of the condenser. In designing the required thermodynamic path, the condenser may be, for example, thermally insulated.

Purification of the fluid occurs predominately through partial condensation. The purification process is described herein in terms of the HCl system. The ESG HCl within the cylinder includes impurities such as, for example, metal contaminants (eg., Fe, Ni, Cr, Cu, Al, Mn, Zn, etc.) moisture (eg., $H_2O$), carbon dioxide (eg., $CO_2$), and the like. Those impurities with a higher boiling point than HCl preferentially concentrate in the liquified state. Impurities in the vapor phase also preferentially concentrate in the liquified state by removal at least in part through a "scavenging" effect. The scavenging effect removes impurities in the two phase region by a nucleation and condensation mechanism. The impurities in the vapor phase preferentially absorb into the nucleating and condensing HCl droplets, and then through gravity action, the larger droplets fall out of the vapor phase into the liquid phase. The liquid phase also traps impurities with higher boiling points than HCl via general solubility characteristics of the impurities and the like. The withdrawn HCl vapor includes lower levels of impurities such as, for example, metal, moisture and carbon dioxide. To prevent the introduction of additional impurities, the purified HCl flows directly from the condenser through the down stream transport line to the semiconductor operation for use. In contrast to the prior art, the present purification process provides an ultra-purified gas from the withdrawn vapor phase for immediate use.

Figure 2:
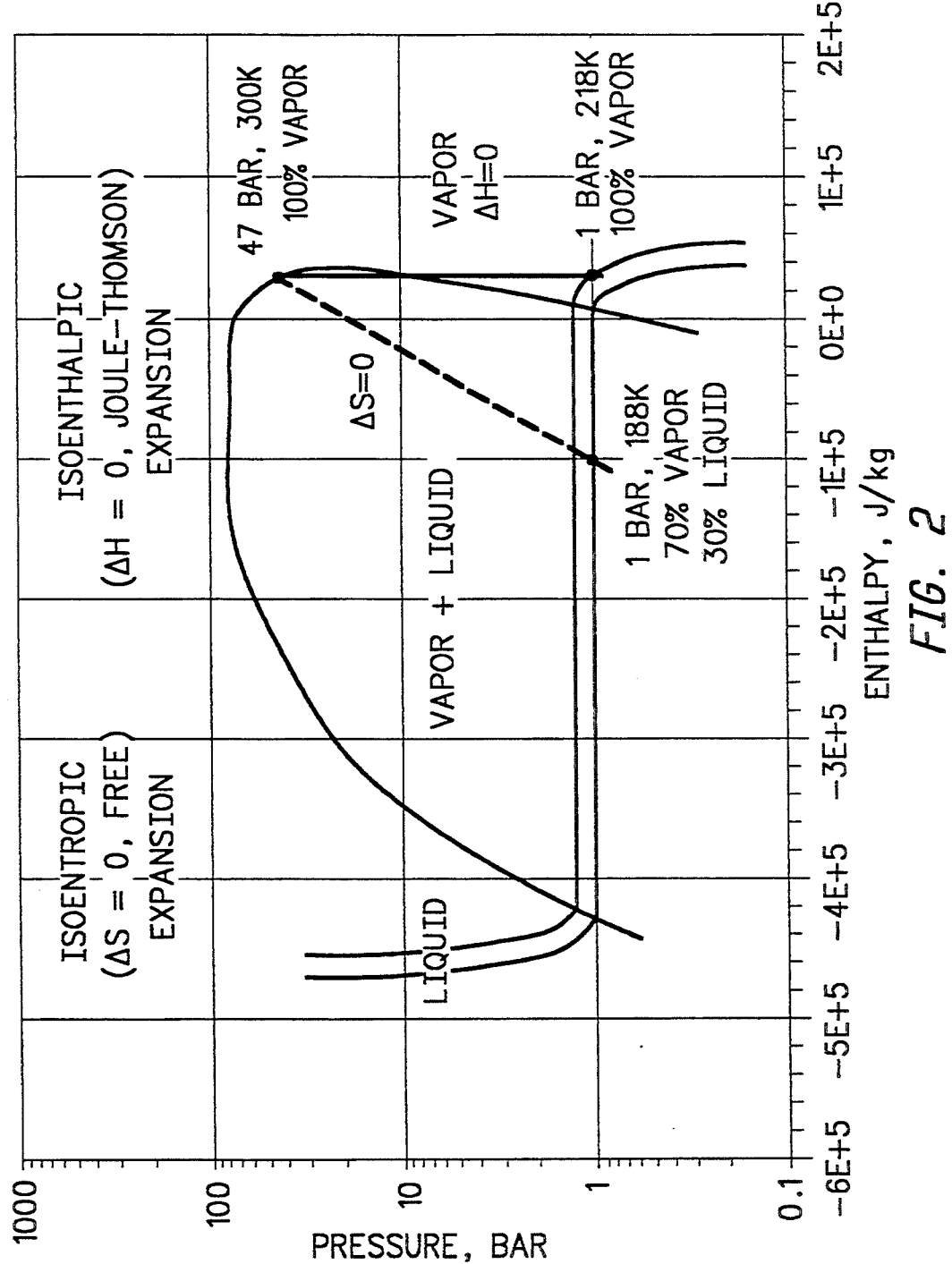
FIG. 2 is a phase diagram for anhydrous HCl for the thermodynamics of cooling via expansion for ESG HCl high volume purification.

FIG. 2 is an anhydrous HCl phase diagram illustrating the thermodynamics of cooling via expansion for ESG HCl high volume purification. The diagram is idealized and illustrates only a few sets of conditions, but others will be readily apparent upon review of this disclosure. Ideally, the HCl expands through an isoentropic (or constant entropy) or isoenthalpic (or constant enthalpy) process. In practice, neither the isoentropic nor the isoenthalpic process can be achieved and the thermodynamic expansion paths shown in FIG. 2 are only provided as illustrations. As shown, enthalpy in units of Joules/kilogram is on the horizontal axis or x-axis ranging from $-6E+5$ to $2E+5$ Joules/kg. Pressure in units of bar is on the vertical or y-axis ranging from 0.1 to 1000 bar. The single thin solid line illustrates the vapor to vapor/liquid interface while the double lines represent the liquid to vapor/liquid interface. The thick solid line and dashed line illustrate the isoenthalpic and isoentropic process, respectively.

For expanding ESG HCl, the isoenthalpic expansion process also called the Joule-Thompson expansion occurs when the condenser is insulated from its surroundings, no shaft work is produced, and the overall changes in kinetic and potential energy are negligible. At steady state, the energy equation at constant enthalpy reduces to the following:

$$\Delta H = 0$$

where $\Delta H$ is the change in enthalpy. As shown, the change in enthalpy for the isoenthalpic expansion process is zero. The isoenthalpic process is generally useful when the particular compressed fluid cools down during expansion. Such compressed fluid inherently has a positive Joule-Thompson coefficient. The ESG HCl is at 100% vapor, at a pressure of about 47 bar, and at a temperature of about 300K. After the constant enthalpy process, the purified HCl gas vapor has a pressure of about 1 bar and temperature of about 218K. The ultra-purified gas withdrawn from the vapor phase is ideally 100% vapor. Practically, the process is not completely isoenthalpic and the liquified gas concentration of the expanded HCl is actually about 10% by weight or less in many cases. Preferably, the concentration of HCl in liquid phase is about 5% by weight or less. This preferred liquid phase concentration of about 5% by weight or less is achieved by expanding the fluid within a thermally insulated condenser. Obviously, other specific conditions may also be employed. For example, an inlet temperature of 300K and outlet temperature of 218K are illustrated, but others may also be used. Inlet pressure will often range from about 80 bar to about 5 bar, and preferably, about 47 bar to about 10 bar for the isoenthalpic process.

As for the isoentropic process or constant-entropy process, it is illustrated in FIG. 2 as the dashed line. The isoentropic process is characterized by the free expansion of ESG HCl through the orifice into the condenser. At steady state, the energy equation reduces to the following:

$$\Delta S = 0$$

where $\Delta S$ is the change in entropy. The change in entropy for the isoentropic expansion process is zero. As shown, like the constant enthalpy process, the starting temperature, pressure, and composition of the ESG HCl are the same but are not limited as such. The ESG HCl also includes impurities. However, in the isoentropic process, the final characteristics of the expanded fluid include a pressure of about 1 bar, temperature of about 218K, and composition of about 70%/30% vapor/liquid. In contrast to the isoenthalpic process, the enthalpy of the fluid decreases for the isoentropic process. For the HCl system, the present method is often more isoenthalpic than isoentropic.

The amount of ultra-purified HCl in the vapor phase is preferably higher, but does not eliminate the liquid phase. As discussed, the liquid phase is necessary for preferentially removing higher boiling point impurities and removing impurities from the vapor phase through at least the scavenging effect. As shown, the amount of liquid in the system may be between about 30% and about 0% by weight in one embodiment. Practically, the liquid phase concentration of HCl is often about 10% by weight or less, and preferably, the liquid phase concentration of the HCl is about 5% by weight or less. From FIG. 2, the final pressure of about 1 bar produces a final HCl temperature between about 188K and about 218K.

EXAMPLES

For the HCl purification process of FIG. 1, the present method achieves superior results in removing water ($H_2O$), carbon dioxide ($CO_2$), and iron (Fe). As discussed, the ESG HCl comprising impurities in the cylinder has a pressure of about 47 bar and a temperature of about 300K. After expansion, the temperature of the HCl can range between about 218K to about 188K. In the experiment, the temperature of the expanded HCl was at about 200K and the pressure was at about 1 bar. To produce the desired flow rate, the orifice diameter can range between about 20 μm to about 90 μm. The experiment utilized an orifice diameter of about 34 μm. The combination of these experimental conditions produces a ultra-purified HCl vapor having 32% less water, 7.6% less carbon dioxide, and 75.4% less metal contaminants in the form of iron than ESG HCl. The experiments are under these conditions are reproduced in Table 1 as follows.

TABLE 1

| Results of ESG HCl via Expansion in a Partially Condensed State | | | |
|---|---|---|---|
| Species | Before | After | Efficiency |
| $H_2O$/HCl | 3.91 +/− 0.79 ppm | 2.66 +/− 0.61 ppm | 32.0% |
| $CO_2$/HCl | 2.50 +/− 0.01 ppm | 2.31 +/− 0.01 ppm | 7.6% |
| Fe/HCl | 627.8 +/− 55.3 ppb | 154.0 +/− 16.0 ppb | 75.4% |

The original ESG HCl included impurities such as $H_2O$, $CO_2$, and Fe at levels of 3.91±0.79 ppm, 2.50±0.01 ppm, and 627.8±55.3 ppb, respectively. After purification, the impurity levels for $H_2O$, $CO_2$, and Fe were 2.6.6±0.61 ppm, 2.31±0.01 ppm, and 154.0±16.0 ppb, respectively. As shown in Table 1, the efficiency rate of the present purification process for $H_2O$/HCl is 32.0%, $CO_2$/HCl is 7.6%, and Fe/HCl is 75.4%. The efficiency rate represents the percentage decrease of an impurity relative to its original concentration level. Thus, the present method provides superior results in the form of, for example, ultra-purified HCl from ESG HCl.

The present method becomes particularly useful if integrated into a large volume on-site purification system, on-line point of use purifier integral with dry processing equipment, or small volume trans-filling purification system integrated into wet processing equipment. As discussed, since semiconductor manufacturers are relying more upon bulk on-site storage of electronic semiconductor grade chemicals to control the costs of raw materials, the purification process of FIG. 1 is useful in the embodiments described herein.

Figure 3A:
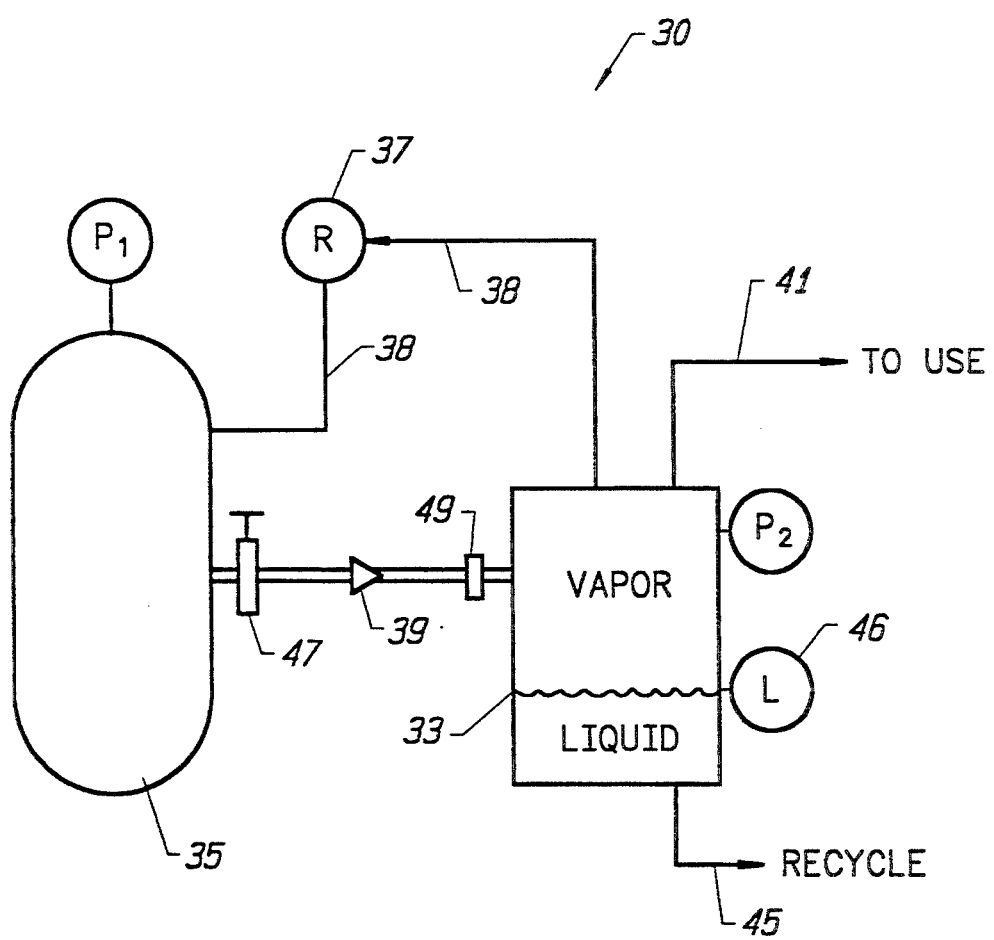
FIG. 3A is a large volume on-site purification system.

FIG. 3A illustrates the large volume on-site purification system 30. The purification apparatus 33 is coupled to the large on-site volume of chemical 35 at pressure $P_1$. As shown, the system of FIG. 3A may include, for example, a pressure control device (R) 37 and return lines 38 to regulate the pressure $P_2$ in the purification apparatus. The pressure control device includes a regulator and relief valve which eliminates the need for a down stream pressure regulator. The apparatus also includes an inlet line 39, outlet line 41, recycle line 45, level control (L) 46, gate valve 47, and orifice 49 or Joule-Thompson valve. After purification, the outlet line transports the ultra-purified chemical to its use and/or storage. The recycle line transports the liquified gas having a higher level of impurities to, for example, an operation not requiring the ultra-purified chemical, transfilling operation, or the like. With the increasing cost of chemicals, the embodiment of FIG. 3A provides the user with ultra-purified chemicals at bulk ESG chemical prices.

Figure 3B:
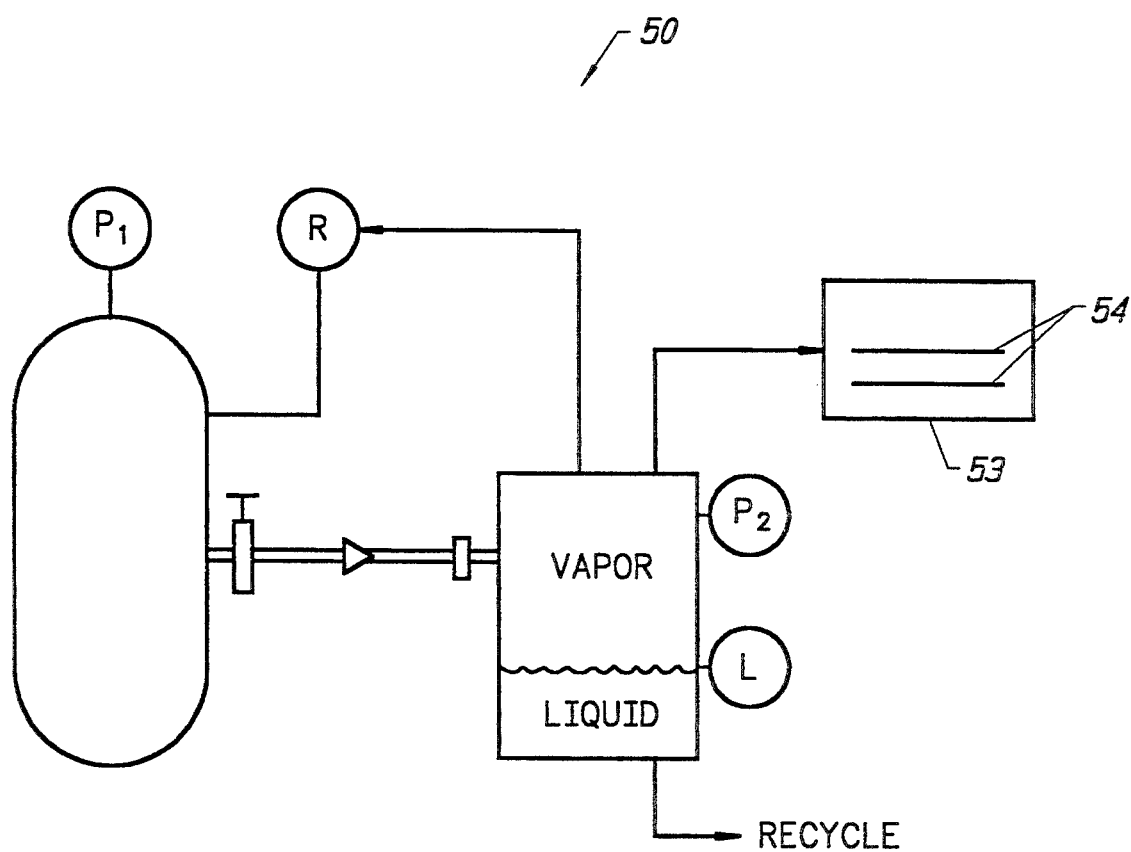
FIG. 3B is a on-line point of use purifier integrated with a semiconductor operation requiring gaseous HCl.

As shown in FIG. 3B, the present apparatus is integrated into semiconductor dry processing equipment to form an on-line point of use purifier system 50. Like the embodiment shown in FIG. 3A, the embodiment of FIG. 3B also includes the volume of chemical source, transport lines, pressure control device (R) including a regulator and relief valve, level sensor (L), gate valve, and orifice or Joule-Thompson valve. In the embodiment of FIG. 3B, the dry processing equipment 53 relies upon processing chemicals in the gas phase. Dry processing equipment may be, for example, a plasma etcher, reactive ion etcher, or the like. As shown, the processing equipment includes electrodes 54. The compressed ESG chemical flows from a volume of processing chemical at pressure $P_1$ into the purification apparatus. From the purification apparatus, the ultra-purified gas flows into the plasma etcher, reactive ion etcher, or the like. With the configuration shown in FIG. 3B, the purification apparatus also eliminates the need for a down stream pressure reduction valve. Moreover, since the chemical is being purified immediately before use, impurities entering the chemical stream from aging cylinders and/or bottles are eliminated.

Figure 3C:
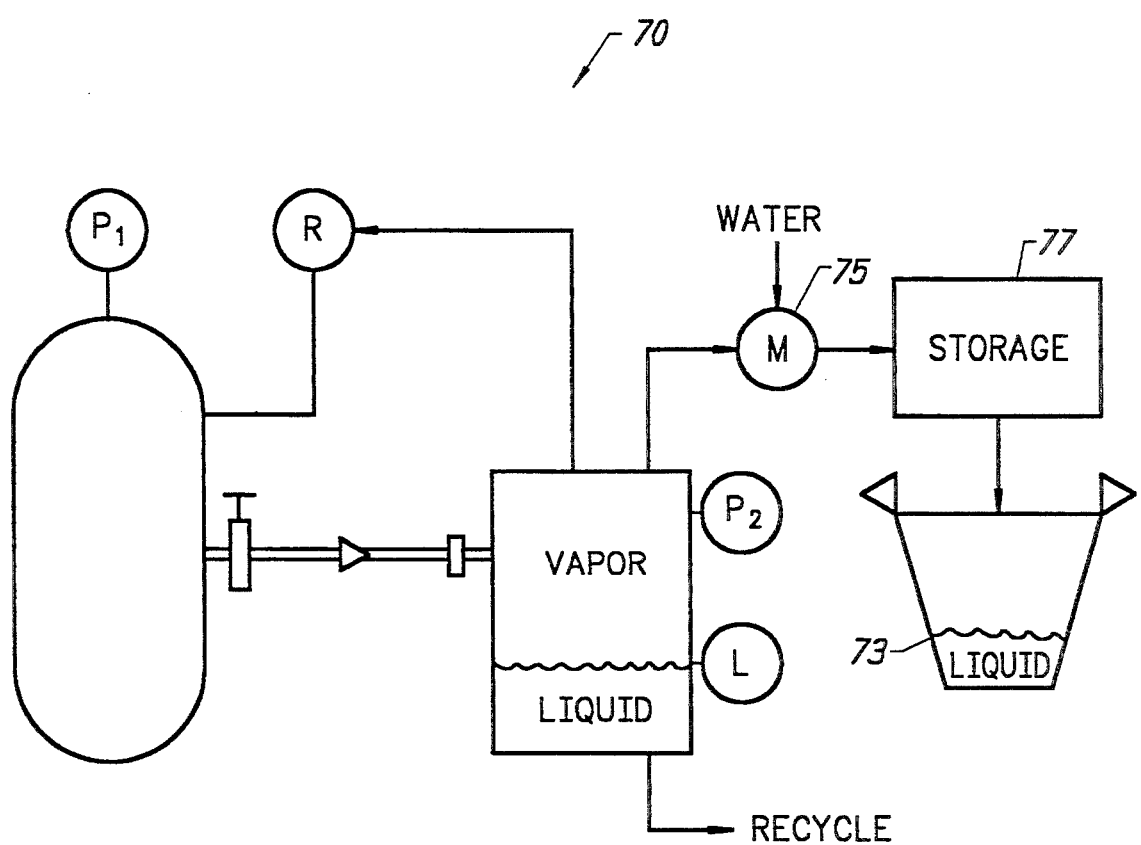
FIG. 3C is a small volume trans-filling purification system for a wet station.

A small volume trans-filling purification system integrated with wet processing equipment 70 is illustrated in FIG. 3C. Like the embodiments shown in FIGS. 3A and 3B, the system of FIG. 3C also includes the volume of chemical storage, transport lines, pressure control device (R) including a regulator and relief valve, level sensor (L), gate valve, and orifice or Joule-Thompson valve. The wet processing equipment 73 may be, for example, a wet etcher, acid dipping tank, plating tank, or the like. The ESG chemical flows from chemical storage through the transfer line into the purification apparatus. From the purification apparatus, the chemical is then mixed 75 in the mixer (M) with purified water (typically 1M ohm or greater) to produce a resulting mixture such as, for example, 37% by weight HCl. The resulting mixture is then optionally transferred into a storage tank and/or cylinder 77. As shown, the mixing step is optional and may be provided as necessary. From the holding tank, the mixed chemical is transferred into the wet processing equipment as required. The purification apparatus provides an ultra-purified composition of mixed chemicals into the holding tank for later use in a wet processing operation. With the configuration shown in FIG. 3C, the purification apparatus also eliminates the need for a down stream pressure reduction valve. In addition, the purification apparatus eliminates the need of an off-line mixing step which has a tendency to introduce impurities into the mixed chemical through handling thereof. Moreover, since the chemical is being purified before use, impurities entering the chemical mixture stream from aging cylinders and/or bottles are eliminated.

In addition to providing ultra-pure chemicals for the systems described herein, the present invention eliminates the need for a down stream pressure reduction valve. As discussed, pressure reduction valves becomes problematic by introducing particles into the stream of chemicals being transferred as the valves degrade. Eventually, pressure reduction valves fail, thereby causing problems including damage to product, equipment, environment, people, or the like. These problematic characteristics are reduced with the present invention.

While the above is a full description of the specific embodiments, various modifications, alternative constructions, and equivalents may be used. For example, while the description above is in terms of purifying HCl, it would be possible to implement the present invention with HBr, $Br_2$, $Cl_2$, $NF_3$, $NH_3$, or the like. The present invention may, for example, be employed with almost any chemical comprising impurities having a vapor pressure ranging from about 1000 bar to about 3 bar at about 300K. In addition, the apparatus shown in FIG. 1 is in terms of a continuous process. A skilled artisan may, alteratively, employ a batch process, transferring process, or the like. Furthermore, the different embodiments shown above are, for example, in context to purifying HCl for semiconductor processing. Alternatively, the embodiments may be in context to a process for the optical, aerospace, pharmaceutical industries, or the like.

Therefore, the above description and illustrations should not be taken as limiting the scope of the present invention which is defined by the appended claims.

What is claimed is:

1. A method for purifying a chemical source for semiconductor processing to an ultra-purified state comprising the steps of:
    providing a compressed fluid comprising impurities;
    expanding said compressed fluid to a partially condensed state which includes at least a vapor phase and a liquid phase, said expanding step preferentially concentrating impurities from said compressed fluid into said liquid phase;
    withdrawing a portion of said vapor phase; and
    using said vapor phase portion in a semiconductor manufacturing operation.

2. The method of claim 1 wherein said compressed fluid is HCl.

3. The method of claim 2 wherein said HCl has a pressure of about 47 bar and temperature of about 300K.

4. The method of claim 2 wherein said expansion step occurs through substantially an isoenthalpic process, said vapor phase being between about 70% and about 99% by weight relative to said compressed fluid.

5. The method of claim 2 wherein said expansion step occurs through an orifice having a diameter between about 10 μm to about 100 μm, said orifice diameter selectively adjusted to produce a desired down stream temperature and a desired flow rate.

6. The method of claim 2 wherein said expanding step occurs at a temperature between about 225K to about 175K.

7. The method of claim 2 wherein said vapor phase portion has a $H_2O$ content less than about 3.5 ppm, a $CO_2$ content less than about 2.5 ppm, and an Fe content less than about 500 ppb.

8. The method of claim 1 wherein said expanding step removes at least about 20% of $H_2O$ in said compressed fluid.

9. The method of claim 1 wherein said expanding step removes at least about 5% of $CO_2$ in said compressed fluid.

10. The method of claim 1 wherein said expanding step removes at least about 60% of Fe in said compressed fluid.

11. The method of claim 1 wherein said compressed fluid is selected from a group consisting of HBr, $Br_2$, $Cl_2$, $NF_3$, and $NH_3$.

12. The method of claim 1 wherein said impurities are one or more selected from a group consisting of Fe, Ni, Cr, Cu, Al, Mn, Zn, $H_2O$, and $CO_2$.

13. The method of claim 1 wherein said semiconductor manufacturing operation operates at about a pressure of said vapor phase.

14. The method of claim 1 wherein said vapor phase flows directly to said semiconductor manufacturing operation without an in-line pressure reduction valve.

15. An apparatus for purifying fluids for semiconductor processing to an ultra-purified state comprising:
    a compressed fluid storage tank having a compressed fluid comprising impurities;
    a condenser having an inlet in-line with said compressed fluid storage tank;
    an orifice coupled to said condenser, said orifice allowing said compressed fluid to expand in said condenser to a partially condensed state which includes at least a vapor phase and a liquid phase, said impurities from said compressed fluid preferentially concentrating in said liquid phase;
    a collector for withdrawing a portion of said vapor phase; and
    processing means on-line with said collector for processing said vapor phase portion in said semiconductor process.

16. The apparatus of claim 15 wherein said compressed fluid is HCl.

17. The apparatus of claim 16 wherein said orifice has a diameter between about 10 μm to about 100 μm, said orifice diameter selectively adjusted producing a desired down stream temperature and a desired flow rate.

18. The apparatus of claim 15 wherein said compressed fluid is selected from a group consisting of HBr, $Br_2$, $Cl_2$, $NF_3$, and $NH_3$.

19. The apparatus of claim 15 wherein said condenser is made of chemical resistant material selected from a group substantially consisting of fluorocarbon based material, glass, and quartz.

20. The apparatus of claim 15 wherein said processing means is selected from a group consisting of plasma etching, wet etching, plating, acid dipping, and reactive ion etching.

21. The apparatus of claim 15 wherein said apparatus is a pressure reduction valve.

22. A method of fabricating a semiconductor device having a processing step using an ultra-purified chemical, said ultra-purified chemical provided on-line to said processing step by a method comprising the steps of:

providing a compressed chemical comprising impurities;

expanding said compressed chemical to a partially condensed state which includes at least a vapor phase and a liquid phase, said expanding step preferentially concentrating impurities from said compressed chemical into said liquid phase;

withdrawing a portion of said vapor phase as said ultra-purified chemical; and using said ultra-purified chemical in said processing step.

23. The method of claim 2 wherein said HCl has a pressure ranging from about 10 bar to about 100 bar and a temperature ranging from about 500K to about 200K.

24. The apparatus of claim 16 wherein said HCl has a pressure ranging from about 10 bar to about 100 bar and a temperature ranging from about 500K to about 200K.

25. A method for purifying a chemical source for semiconductor processing to an ultra-purified state comprising the steps of:

providing a compressed fluid selected from a group consisting of HCl, HBr, $Br_2$, $Cl_2$, $NF_3$, and $NH_3$ comprising impurities;

expanding said compressed fluid to a partially condensed state which includes at least a vapor phase and a liquid phase, said expanding step preferentially concentrating impurities from said compressed fluid into said liquid phase;

withdrawing a portion of said vapor phase; and using said vapor phase portion in an on-line semiconductor manufacturing operation.

26. The method of claim 25 wherein said expanding step removes at least about 20% of $H_2O$ in said compressed fluid.

27. The method of claim 25 wherein said expanding step removes at least about 5% of $CO_2$ in said compressed fluid.

28. The method of claim 25 wherein said expanding step removes at least about 60% of Fe in said compressed fluid.

29. The method of claim 25 wherein said impurities are one or more selected from a group consisting of Fe, Ni, Cr, Cu, Al, Mn, Zn, $H_2O$, and $CO_2$.

30. A method for purifying a chemical source to an ultra-purified state and adjusting a flow rate and a temperature of said ultra-purified state comprising the steps of:

providing a compressed fluid comprising impurities;

expanding said compressed fluid to a partially condensed state which includes at least a vapor phase and a liquid phase, said expanding step preferentially concentrating impurities from said compressed fluid into said liquid phase, said expanding step occurring through an orifice having a desired diameter to produce a desired downstream temperature and a desired flow rate;

withdrawing a portion of said vapor phase; and directly using said vapor phase portion in an on-line semiconductor manufacturing operation.

31. The method of claim 30 wherein said desired orifice diameter is between about 10 μm to about 100 μm.

32. A system for providing fluids to a semiconductor process, said system purifying fluids to an ultra-purified state and producing a desired downstream temperature and a desired downstream flow rate, said system comprising:

a compressed fluid storage tank, said compressed fluid comprising impurities;

a condenser having an inlet in-line with said compressed fluid storage tank;

an orifice coupled to said condenser, said orifice allowing said compressed fluid to expand in said condenser to a partially condensed state which includes at least a vapor phase and a liquid phase, said impurities from said compressed fluid preferentially concentrating in said liquid phase, said orifice including a desired diameter selectively adjusted to produce a desired down stream temperature and a desired flow rate;

a collector for withdrawing a portion of said vapor phase; and processing means on-line with said collector for processing said vapor phase portion in said semiconductor process.

33. The apparatus of claim 32 wherein said orifice has a desired diameter between about 10 μm to about 100 μm.

34. The apparatus of claim 32 wherein said condenser is made of chemical resistant material selected from a group substantially consisting of fluorocarbon based material, glass, and quartz.

35. The apparatus of claim 32 wherein said processing means is selected from a group consisting of plasma etching, wet etching, plating, acid dipping, and reactive ion etching.

* * * * *